United States Patent
Ungar et al.

(10) Patent No.: US 8,459,667 B2
(45) Date of Patent: Jun. 11, 2013

(54) FOOT-PROPELLED HOBBY AND/OR SPORT DEVICE WITHOUT HANDLEBAR

(75) Inventors: Soma Gabor Ungar, Budapest (HU); Andras Goczey, Budapest (HU)

(73) Assignee: M W Innovators Limited (GB)

( * ) Notice: Subject to any disclaimer, the term of this patent is extended or adjusted under 35 U.S.C. 154(b) by 0 days.

(21) Appl. No.: 11/587,077

(22) PCT Filed: Mar. 2, 2005

(86) PCT No.: PCT/HU2005/000023
§ 371 (c)(1),
(2), (4) Date: Sep. 10, 2007

(87) PCT Pub. No.: WO2005/100139
PCT Pub. Date: Oct. 27, 2005

(65) Prior Publication Data
US 2008/0143073 A1    Jun. 19, 2008

(30) Foreign Application Priority Data

Apr. 19, 2004  (HU) .................................. 0400817
Oct. 5, 2004   (HU) .................................. 0402012

(51) Int. Cl.
*B62M 1/00*  (2010.01)
(52) U.S. Cl.
USPC .................................. 280/87.041; 280/87.01
(58) Field of Classification Search
USPC ................. 280/87.041, 87.021, 87.01, 23.1, 280/32.6, 205, 47.3
See application file for complete search history.

(56) References Cited

U.S. PATENT DOCUMENTS

| 550,309 A | 11/1895 | Wilzin |
| 1,585,258 A * | 5/1926 | Moore .......................... 280/205 |

(Continued)

FOREIGN PATENT DOCUMENTS

| EP | 0488436 | 6/1992 |
| FR | 2776980 | * 10/1999 |

(Continued)

OTHER PUBLICATIONS

NL 1 019 905 C1 (Johannes Petrus Maria Helderman) Aug. 7, 2003.*

(Continued)

*Primary Examiner* — Frank Vanaman
(74) *Attorney, Agent, or Firm* — Blakely, Sokoloff Taylor & Zafman

(57) ABSTRACT

The invention relates to a foot-propelled wheeled hobby and/or sport device which has a wheel (1) situated between two side-plates (2; 3), and the side-plates (2; 3) are suspended on the axle (X) of the wheel (1). Foot-boards (5) situated below the axle (X) of the wheel (1). Foot-boards (5) situated below the axle (X) of the wheel (1), protruding outwards are connected to the side-plates (2; 3). In the course of the appropriate use of the device (I; II) the side-plates (2; 3) project over the knee of the user (12) standing on one or both of the foot-boards (5), providing a supporting surface (a) for the knee. The invention is based on that at a certain distance (e) behind the wheel (1)—with respect to the travelling direction—there is a structure in the range of the track of the wheel (1) ensuring stabilisation against tilting, and in order to relieve the knees of any load the side-plates (3) are constructed with a height (L) ensuring a supporting surface (b) for the user's (12) thigh.

8 Claims, 2 Drawing Sheets

U.S. PATENT DOCUMENTS

| | | | | |
|---|---|---|---|---|
| 1,685,614 | A * | 9/1928 | Peacock | 280/87.05 |
| 2,198,857 | A | 4/1940 | Branson | |
| 2,776,980 | A * | 1/1957 | Kyrides et al. | 549/81 |
| 2,950,127 | A * | 8/1960 | Phillips | 280/304 |
| 2,971,773 | A * | 2/1961 | McKissick | 280/205 |
| 3,399,742 | A | 9/1968 | Malick | |
| 4,623,158 | A * | 11/1986 | Monreal | 280/11.12 |
| 5,320,372 | A * | 6/1994 | Langen | 280/207 |
| 5,427,391 | A * | 6/1995 | Cooper | 280/11.19 |
| 5,454,579 | A * | 10/1995 | Chen | 280/205 |
| 5,868,413 | A * | 2/1999 | Cabrera | 280/205 |
| 6,302,413 | B1 * | 10/2001 | Comeaux | 280/32.5 |
| 2004/0061299 | A1 * | 4/2004 | Garner | 280/87.041 |
| 2006/0038372 | A1 * | 2/2006 | Goczey et al. | 280/205 |

FOREIGN PATENT DOCUMENTS

| | | |
|---|---|---|
| JP | 62-049493 | 3/1987 |
| JP | 2000-016359 | 1/2000 |
| RU | 2 037 448 | 6/1995 |
| WO | WO 2004/000635 | 12/2003 |

OTHER PUBLICATIONS

Translation into English of the text of the previously cited reference to Helderman (NL 1,019,905). Translation reference No. PTO 09-6951, obtained Aug. 2009.*

* cited by examiner

FOOT-PROPELLED HOBBY AND/OR SPORT DEVICE WITHOUT HANDLEBAR

The present patent application is a non-provisional application of International Application No. PCT/HU2005/000023, filed Mar. 2, 2005.

BACKGROUND OF THE INVENTION

1. Field of the invention

The invention relates to a foot-propelled wheeled hobby and/or sport device.

2. Description of the Related Art

Popular devices for spending one's spare time doing exercise are various foot-propelled structures rolling on wheels, and the most popular one of these, which has been used all over the world for several decades, is the traditional bicycle propelled with foot-pedals while sitting on a saddle. Beside bicycles, which have a relatively complicated structure and large size, numerous other simpler and smaller foot-propelled wheeled hobby devices are also known which are used for sport-like hobby activities, such as roller-skates, which are attached to the user's feet, or two-wheeled scooters, which also have handlebars similar to bicycle handlebars and a long, narrow board to the front and to the rear part of which the wheels are attached, and the user stands with one foot on the board while propelling the scooter with the other foot. Another widely used device is the skateboard, which has four wheels with a small diameter, the user stands on it and propels it with movements similar to propelling a scooter, and on a sloping surface the user stands on it with both feet and rolls on it balancing with his/her body. Finally we mention a known foot-propelled sport or hobby device which has one single wheel with spokes similar to bicycle wheels, but for the use of this device individual—balancing—skills are needed which not many people have, so it could not become a wide-spread article used by masses of people, even in its form stabilised with servomotors, which obviously increases production costs significantly.

In connection with skateboards mentioned above it must be pointed out that—although they are fairly popular hobby devices—they are rather slow and not very manoeuvrable due to rather high resistance of the four small diameter wheels. Also skateboards can also be criticised from the aspects of safety, because if the user falls off this sport device or steps off for some other reason, the device escapes, for example, on a sloping road it may roll down and cause an accident.

International patent application No. PCT/HU2003/000043, published on 31$^{st}$ Dec. 2003 under No. WO 2004/000635 A1 describes a foot-propelled wheeled hobby and/or sport device which has foot-boards and a wheel situated between two side-plates, which side-plates are suspended on the axle of the wheel; foot-boards situated under the axle of the wheel, protruding outwards are connected to the side-plates; and during the appropriate use of the device the side-plates project over the knees of the user standing on one or both of the foot-boards, ensuring a supporting surface for the knees (a).

This device makes propelling and movement possible similar to using a skateboard. The user of the device stands on the foot-board with one foot putting eccentric loading on the device by this, and with the other foot he/she propels the device pushing away from the ground, and progresses by repeating these actions with alternate feet, that is standing on the foot-board and pushing away from the ground alternately on the two sides. Composite action between the wheel and the user's foot standing on the foot-board putting eccentric loading on the device is ensured by the friction force generated between the knees—partly the lower part of the leg—and one of the side-plates from the horizontal reaction force of the torque generated by the eccentric loading in the course of the alternate actions of standing and pushing.

Although this device is faster and more manoeuvrable than a skateboard, there is a risk of tilting forwards or backwards especially in the case of high travelling speeds that can be reached by intensive propelling, which requires fairly good skills from the user. A further problem may be that the supporting—friction connection—of the lower part of the leg and the knee against the side-plate represents a significant loading on the user's knee.

BRIEF SUMMARY OF THE INVENTION

The task to be solved with the invention is the improvement of the above foot-propelled wheeled hobby and/or sport device to increase its stability and safety.

The invention is based on the recognition that the risk of tilting forwards or backwards can be eliminated, if the device has a stabilising device, favourably a satellite wheel with a diameter significantly smaller than that of the wheel, behind the wheel—facing the travelling direction—or in a given case even in front of the wheel, in the track of the wheel, attached to at least one, favourably both of the side-plates, continuously or periodically resting on the ground while travelling. We also realised that the connection between the user and the side-plate can be made more stable, if the side-plate has a thigh-supporting surface instead of or beside the knee-supporting surface.

On the basis of the above recognition, in accordance with the invention the set task was solved with a foot-propelled wheeled hobby and/or sport device, which has a wheel situated between two side-plates, and the side-plates are suspended on the axle of the wheel; foot-boards situated below the axle of the wheel, protruding outwards are connected to the side-plates; and in the course of the appropriate use of the device the side-plates project over the knee of the user standing on one or both of the foot-boards, providing a supporting surface for the knee; and the above hobby and sport device is characterised by that at a certain distance behind the device—with respect to the travelling direction—there is a structure in the range of the track of the wheel ensuring stabilisation against tilting. Favourably the structure ensuring stabilisation is a satellite wheel. Practically the structure ensuring stabilisation is connected to one or more cantilevered holding-members attached to or forming a part of the side-plate(s), protruding backwards. It may also be favourable if the satellite wheel is connected to the holding-member belonging to the side-plate(s) via a wheel-fork by inserting a rotatable coupling-member. In general the lowest point of the structure ensuring stabilisation, favourably a satellite wheel, is in the same or more or less the same plane with the lowest point of the wheel.

According to a different criteria of the invention at a certain distance in front of the device—with respect to the travelling direction—there is a second structure in the range of the track of the wheel ensuring stabilisation against tilting, favourably a satellite wheel. In this case it is practical, if the second structure ensuring stabilisation, favourably a satellite wheel, is situated at a certain distance above the ground in the normal running condition of the device.

According to a further construction example the side-plates are constructed with a height ensuring a supporting surface for the user's thigh; practically the side-plates should project over the highest point of the wheel, at a certain distance.

BRIEF DESCRIPTION OF THE DRAWING

Below the invention is described in detail on the basis of attached drawings containing the favourable construction examples of the hobby and sport device. In the drawings

DETAILED DESCRIPTION OF THE INVENTION

Figure 2:
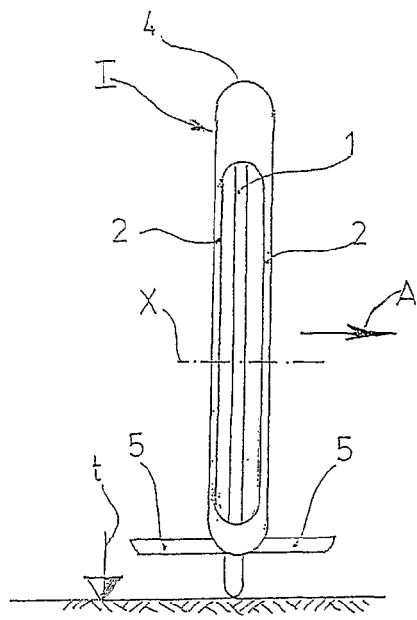
FIG. 2 is the view taken from the direction of arrow A as shown in FIG. 1.
Figure 1:
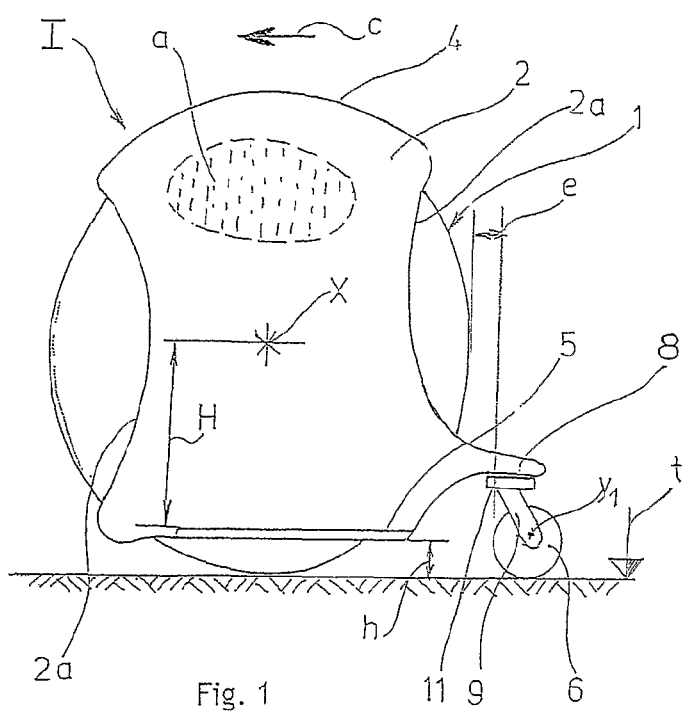
FIG. 1 is the side-view of a construction of the device.

The hobby and/or sport device marked in FIGS. 1 and 2 with reference number I as a whole has a wheel 1, the main dimensions of which—e.g.: its diameter and rim width—are practically the same as the dimensions of an average (standard) racing bicycle wheel. On the axle X—shown on the figures only with a dotted line or a dot—of the wheel 1 side-plates 2 are suspended on both sides projecting over the highest point of the wheel 1 at the top and ending at a certain distance h above the lowest point of the wheel 1, that is when the wheel 1 is in use, above the ground t on which is rests. The extent to which the side-plates 2 project over the wheel 1 should be determined to provide an appropriate supporting place for the internal surface of the user's 12 knees, which place is encircled in FIG. 1 with a broken line, filled with dots and marked with reference letter a. The lower distance h mentioned above must be determined so that when the device I is in use the foot-boards 5 constructed in one piece with the side-plates 2 protruding outwards on both sides from the range of the lower rim of the side-plates 2 are situated as close as possible to the ground t, and in this way the distance H of the foot-boards 5 measured from the axle X can be chosen to be as large as possible so that they are situated just above the ground. The larger the distance H is, the more stable the device I is when in use. Due to the construction, as it can be seen in FIG. 2, the foot-boards 5 are positioned outside the plane of the wheel 1, practically perpendicular to it. The side-plates 2 are situated at the smallest possible distance from the side-surfaces of the wheel 1. The function of the side-plates 2, apart from ensuring a supporting surface a, is to cover the wheel 1 as a side-cover partly preventing the wheel 1 from touching the leg—which may cause injury—and partly to provide a supporting surface for the leg too, in order to enable it to exert some lateral pressure.

The stability of the whole device I is also increased by the fact that on top the side-plates 2 are clamped and braced together with a curved connection-rib 4 that covers the upper range of the wheel 1. The side-plates 2 are constructed in a way that facing the travelling direction of the device I as shown by arrow c (FIG. 1) both at the front and at the back— that is on both sides—they have concave curves 2a looking at them from outside, as a result of which the whole device I becomes lighter, and the front and rear part of the wheel is uncovered. Obviously the wheel I protrudes from between the side-plates 2 at the bottom too and rests on the ground t.

In the case of the construction example according to FIGS. 1 and 2, the side-plates 2 have bracket holding-members 8 protruding backwards with respect to the travelling direction c, to which a wheel-fork 9 protruding diagonally backwards and downwards is attached by inserting a connection-member 11 that can rotate around the vertical axis, and the wheel-fork 9 holds a satellite wheel 6 with an axis $y_1$ situated behind the wheel 1 on the same or practically the same track with it; its travelling direction, due to the rotatable connection-member 11, freely changes during travelling, that is it follows the changes of direction of the wheel 1. During travelling slight loading is transferred to the rear satellite wheel 6—which can roll continuously on the ground together with the wheel—its role is not to carry the user's weight, but to control or stabilise the tilting of the user forwards or backwards with respect to the travelling direction—progressing direction—shown by arrow c. The minimal distance between the running edges of the wheel and the 1 satellite wheel 6—marked with reference letter e in FIG. 1—must be determined in a way that it ensures complete stability against tilting and at the same time it does not unnecessarily increase the resistance to rolling, which is greater because of the smaller wheel and is reciprocally proportional with the length of the arm.

Figure 3:
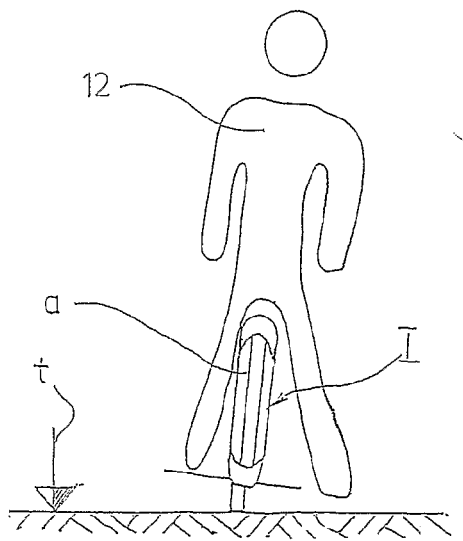
FIGS. 3 and 4 show the use of the device.
Figure 4:
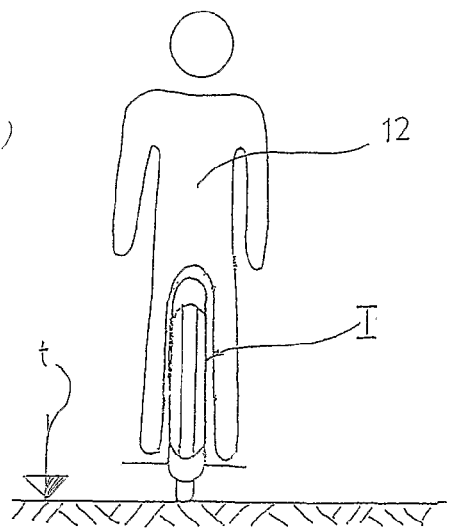

Below the use and working principle of the device I according to FIGS. 1 and 2 is described with reference to FIGS. 3 and 4.

Both in the propelling (FIG. 3) and in the free running (FIG. 4) phase the device I is situated between the legs of the user 12. When starting, the user 12 takes the device I between his/her legs and holds it there in standing position during use. In the first step the user 12 stands on one of the foot-boards 5 with one foot, as a result of which the supporting surface a (FIG. 1) pushes against the internal surface of knee on the same leg, as the user 12 applies eccentric loading on the wheel 1—outside the plane of the wheel 1, beside the wheel—as a result of which horizontal forces are generated affecting the knee via the supporting surface a so that it pushes the internal surface of the knee. In this way the user 12 has a stable connection with the device I on two points, namely the his/her sole with one of the foot-boards 5, and the internal side of his/her knee with one of the side-plates 2 situated on the same side as the above foot-board 5. These two connections are sufficient for the safe control of the device. In the phase according to FIG. 3 the user 12 propels the device I with his/her free leg—not supporting against anything—like a scooter and progresses while he/she stands on one of the foot-boards 5 with his/her other leg supporting himself/herself with the internal side of his/her knee (FIG. 1, arrow c). When the device I is going fast enough, the user 12 stands with his/her propelling leg on the foot-board 5 too, as a result of which the eccentric loading is terminated, that is the loading of the two legs outside the plane of the wheel, and by this—as the supporting surface a does not push the internal side of the knee any more—the horizontal forces disappear. So in the free-rolling phase shown in FIG. 4 the connection between the knee and the device I—with its side-plate— discontinues, but as the user stands on the device I with both legs, sufficient connection—on two points, on the two foot-boards 5—is ensured again for the user 12 to have safe control over the device I. The satellite wheel 6 perfectly stabilises the device I against tilting.

Figure 5:
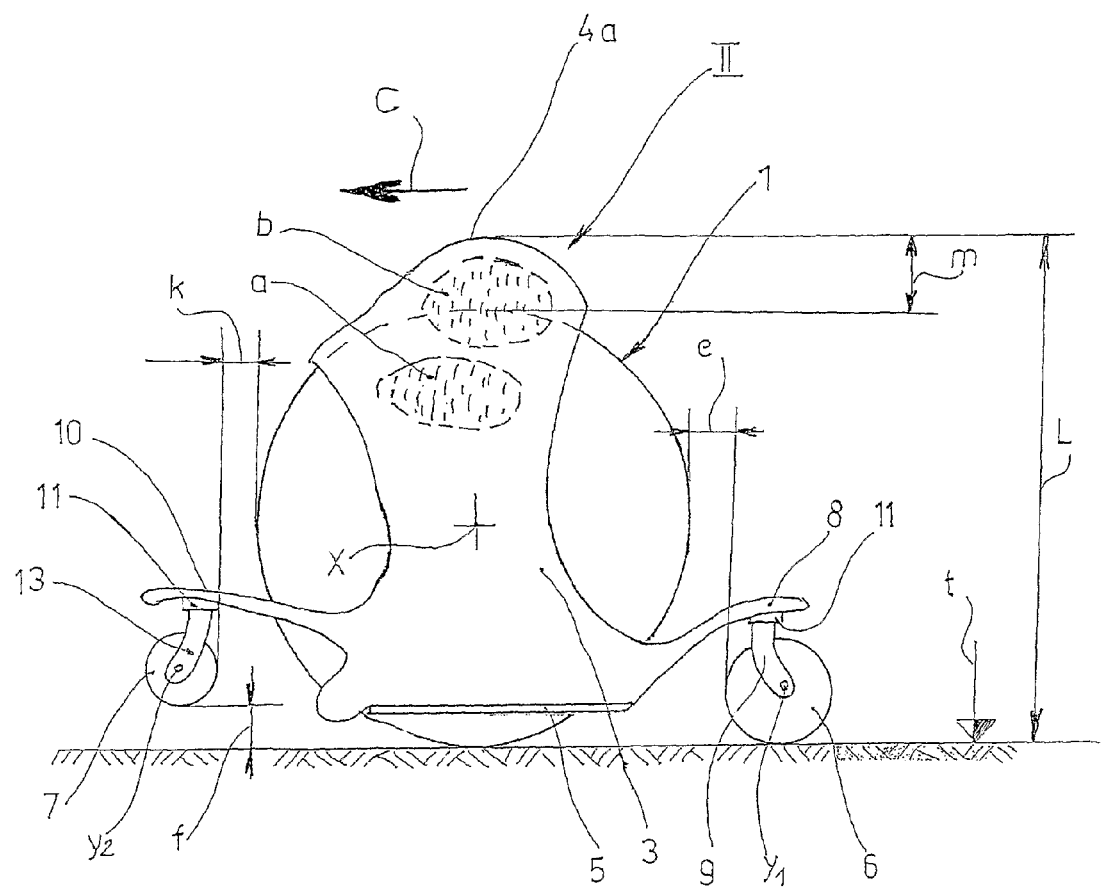
FIG. 5 is the side-view of another construction of the device.

The hobby and/or sport device II according to FIG. 5 is different from the device I shown in FIGS. 1 and 2—keeping its basic construction as a result of which the reference numbers and signs used in FIGS. 1 and 2 are also used in FIG. 5 to mark the same elements—in two respects.

One of the differences is that the side-plates 3 are higher than the side-plates 2, they project over the highest point of the wheel 1 by a certain distance m—in other words the total height L is determined to realise this condition—and in this way apart from the supporting surface a allocated to the user's 12 knee they also have a supporting surface b to support the thighs, which makes steering and progressing even more stable and terminates the extreme lateral loading of the knee, because it provides support on the basis of the same principle with supporting surface a—the knee supporting surface—but in about the central range of the internal side of the thigh.

The other difference is that besides the satellite wheel 6 the device II has a second, frontal satellite wheel 7 on the other side, with respect to the travelling direction shown by arrow c, which satellite wheel 7 is also situated in the track of the wheel 1, and it is also connected to the end of the bracket holding-members 10 of the side-plates 3 clamped together with a connection-rib 4a on the top by inserting a rotatable connection-member 11, with the help of the wheel-fork 13. In space the axle $y_2$ of the e satellite wheel runs above the axle $y_1$ of the satellite wheel 6, and in the ordinary propelling and running condition of the device II the lowest point of the satellite wheel 7 is above the ground t at a distance f. The minimum distance of the running edge of the satellite wheel 7 from the running edge of the wheel 1 is marked with reference letter k; its extent can be the same as that of distance e, e.g.: a few cm-s. Consequently in ordinary running and propelling condition the satellite wheel 7 does not touch the ground t (the extent of distance f can be a few cm-s). During the use of the device II the front satellite wheel 7 has an active role when the user 12 wants to go backwards with the device; in this case satellite wheel 6 lifts off the ground t, and satellite wheel 7 rolls on the ground t ensuring stability for the device II against tilting in the travelling direction.

The advantage of the invention is that the resistance of the device—first of all due to the large diameter of the wheel—is low, significantly lower than in the case of some other similar sport and/or hobby device such as a skateboard, and as a result of this it can be propelled much faster and easier than, for example, a skateboard, and it can be controlled fairly easily with small movements of the ankles or the hips. Due to the fact that when the user steps off the device it falls to the side immediately, stops rolling and remains lying on the ground, it is much less liable to cause accidents than a skateboard that rolls on freely and independently in this case. A further advantage is that the stability of the device, due to the satellite wheel or wheels and the heightened side-plates providing a thigh-supporting surface, is far more stable than the hobby and/or sport device of a similar character described above in the introductory part, and as a result of this it is much easier to control both in the propelling and running phase. Any extreme loading is taken off the knees.

Obviously the invention is not restricted to the construction examples described in detail above, but it can be realised in several ways within the scope of protection defined by the claims. The device may also be engine-driven (auxiliary engine) and/or it may be provided with a seat.

The invention claimed is:

1. A handlebarless foot-propelled wheeled hobby and/or sport device, which has a wheel (1) disposed between two side-plates, the side-plates suspended on an axle (X) of the wheel (1);

foot-boards (5) disposed below the axle (X) of the wheel (1), protruding outwards, coupled to the side-plates;

wherein the side-plates project over the foot-boards (5), and extend in a direction parallel to the wheel thereby providing supporting surfaces (a) for each knee of a user of the device, said supporting surfaces configured to extend so as to transfer horizontal force to a substantial portion of an inner side of each said knee in a direction perpendicular to a traveling direction of the wheel when the user is accelerating the device by foot propulsion wherein at a predetermined distance (e) behind the wheel, with respect to the travelling direction, there is a structure ensuring stabilisation against tilting in the traveling direction;

wherein the supporting surfaces are substantially flat and sized so as to act against the entire side of each knee, which surfaces are adapted to transfer the horizontal force to the inner side of each knee;

wherein the structure includes a satellite wheel with a diameter substantially smaller than that of the wheel, said structure disposed behind the wheel with respect to the traveling direction and is coupled to at least one of the side-plates;

wherein the satellite wheel is configured to allow the device to freely tilt in a direction perpendicular to the traveling direction.

2. Foot-propelled wheeled hobby and/or sport device as in claim 1, wherein the structure ensuring stabilisation is connected to at least one cantilevered holding-member (8) attached to or forming a part of the side-plates protruding backwards.

3. Foot-propelled wheeled hobby and/or sport device as in claim 2, wherein the satellite wheel (6) is connected to the at least one holding-member (8) belonging to the side-plates via a wheel-fork (9) by inserting a rotatable coupling-member.

4. Foot-propelled wheeled hobby and/or sport device as in claim 1, wherein a lowest point of the structure ensuring stabilisation, is substantially in the same plane as a lowest point of the wheel (1).

5. Foot-propelled wheeled hobby and/or sport device as in claim 1, wherein at a predetermined distance (k) in front of the wheel, with respect to the travelling direction, there is a second structure ensuring stabilisation against tilting.

6. Foot-propelled wheeled hobby and/or sport device as in claim 5, wherein the second structure ensuring stabilisation, is disposed at a predetermined distance (f) above the ground (t).

7. Foot-propelled wheeled hobby and/or sport device as in claim 1, wherein the side-plates are constructed with a height (L) ensuring a supporting surface (b) for the user's (12) thigh.

8. Foot-propelled wheeled hobby and/or sport device as in claim 7, wherein the side-plates project over the highest point of the wheel (1), at a predetermined distance (m).

* * * * *